(12) United States Patent
Fontaine et al.

(10) Patent No.: US 12,479,236 B2
(45) Date of Patent: Nov. 25, 2025

(54) VEHICLE WHEEL WITH A PARTICLE COLLECTOR

(71) Applicant: The Goodyear Tire & Rubber Company, Akron, OH (US)

(72) Inventors: Sebastien Willy Fontaine, Vichten (LU); Armand Rene Gabriel Leconte, Echillais (FR); Frederic Ngo, Mersch (LU); Bodo Aherns, Trier (DE); Vincent Jean-Emile Decouvreur, Florennes (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 485 days.

(21) Appl. No.: 18/064,976

(22) Filed: Dec. 13, 2022

(65) Prior Publication Data

US 2024/0190172 A1   Jun. 13, 2024

(51) Int. Cl.
*B60B 21/12* (2006.01)
*B60B 11/04* (2006.01)

(52) U.S. Cl.
CPC .............. *B60B 21/12* (2013.01); *B60B 11/04* (2013.01)

(58) Field of Classification Search
CPC . B60B 21/12; B60B 11/04; B60S 1/66; B60S 1/68; B08B 5/04; F16D 65/0031; B62D 25/18
USPC ..................................... 301/95.101
See application file for complete search history.

(56) References Cited

U.S. PATENT DOCUMENTS

| | | | | |
|---|---|---|---|---|
| 1,509,937 A | * | 9/1924 | Down ..................... | F16D 65/78 301/6.3 |
| 1,730,490 A | * | 10/1929 | Winchester ............. | B60B 11/06 301/5.1 |
| 3,168,348 A | * | 2/1965 | Fleming .................. | B60B 19/10 301/6.3 |
| 4,124,052 A | * | 11/1978 | Beauchamp ............ | B60C 11/01 152/209.1 |
| 4,135,764 A | * | 1/1979 | Johnson .................. | B60B 19/10 188/264 AA |
| 4,484,667 A | * | 11/1984 | Bottieri, Jr. ............. | B60T 1/065 188/218 A |

(Continued)

FOREIGN PATENT DOCUMENTS

| | | | | |
|---|---|---|---|---|
| DE | 102017221188 A1 | * | 5/2019 | ............. B60B 21/02 |
| IT | 201800010194 A1 | * | 5/2020 | ................ B60T 5/00 |

(Continued)

*Primary Examiner* — S. Joseph Morano
*Assistant Examiner* — Eva L Comino
(74) *Attorney, Agent, or Firm* — Eryn Ace Fuhrer; June E. Rickey

(57) ABSTRACT

A wheel assembly having a wheel rotation axis; a rim with an outer surface around the wheel rotation axis; wherein the outer surface comprising suction ports; two tires mounted on the outer surface of the rim; a particle collector adapted to trap particles entering said particle collector; a particle suction system with a bladed suction structure configured for generating a suction air flow in the rim upon rotation of said bladed suction structure about the wheel rotation axis; an air passage connecting the suction ports to the bladed suction structure via the particle collector in order to suck particles through the suction ports by means of the suction air flow generated by the bladed suction structure.

14 Claims, 4 Drawing Sheets

(56) References Cited

U.S. PATENT DOCUMENTS

| | | | | |
|---|---|---|---|---|
| 4,950,035 | A | * | 8/1990 | Villarreal ................ F16D 65/78 |
| | | | | 188/264 AA |
| 6,155,650 | A | * | 12/2000 | Barger .................. F16D 65/847 |
| | | | | 188/264 AA |
| 7,833,302 | B2 | * | 11/2010 | Krantz ............... B01D 53/0407 |
| | | | | 55/385.3 |
| 10,300,739 | B1 | * | 5/2019 | Saied .................... B60B 7/0086 |
| 2005/0088035 | A1 | * | 4/2005 | Bonaldi .................. B60B 11/04 |
| | | | | 301/36.1 |
| 2021/0114416 | A1 | * | 4/2021 | Lambillotte ............ B60C 11/01 |

FOREIGN PATENT DOCUMENTS

| | | | | | |
|---|---|---|---|---|---|
| JP | H07232508 | A | * | 9/1995 | |
| KR | 20140101951 | A | * | 8/2014 | ............. B60B 21/12 |
| SE | 424219 | B | * | 7/1982 | ............. F16D 55/00 |
| SE | 461580 | B | * | 3/1990 | ............. B60B 11/04 |

\* cited by examiner

VEHICLE WHEEL WITH A PARTICLE COLLECTOR

FIELD OF THE INVENTION

The invention pertains to the domain of vehicle wheels. More precisely, the invention provides a wheel assembly with a particle collecting function.

BACKGROUND OF THE INVENTION

A wheel is responsible for physically connecting a vehicle to the ground surface such as a road surface. It is involved while transmitting the wheel torque to the ground to accelerate and brake. It is also involved in curves for keeping track control. In other words, the vehicle tire is responsible for the vehicle's safety; in both dry and wet conditions.

During its lifetime, a vehicle tire gradually wears due to contact on the road surface. This wear phenomenon generates tire particles released in the environment. Thus, there is a need for reducing particle emissions in the environment.

The document JP2004142719 discloses a power transmission part for an automobile. The power transmission part comprises a tubeless tire defining a tread portion with a center groove. The center groove is in fluid flow communication with a suction port connected to a vacuum chamber. The vacuum chamber is provided with a valve in a pipe connected to a vacuum pump or a suction object. The slip-preventing power transmission part is furnished with a filter for preventing dust from entering the vacuum pump or the suction object. The power transmission part comprises a suction hose connected to a cylindrical dust-collecting chamber and a suction chamber. The suction hose is made L-shaped with a dust removal chamber that separates dust from the air and accumulates dust in the cylindrical bottom. The suction chamber does not rotate. Hence, it requires specific seals at the rotating interfaces. In addition, the transmission part of the automobile is bulky. It requires an energy source to power the vacuum pump.

It is thus desired to improve or solve at least one drawback of the prior art and to reduce the energy need of a wheel assembly adapted to suck particles.

SUMMARY OF THE INVENTION

According to a first aspect of the invention a wheel assembly is provided having a wheel rotation axis; two tires mounted on the outer surface of the rim; a rim with an outer surface around the wheel rotation axis wherein the outer surface has suction ports between the two tires; a particle collector adapted to trap particles entering said particle collector; a bladed suction structure configured for generating a suction air flow in the rim upon rotation of said bladed suction structure about the wheel rotation axis; and an air passage connecting the suction ports to the bladed suction structure; the particle collector collecting particles sucked through the suction ports using the suction air flow generated by the bladed suction structure.

According to a second aspect of the invention a wheel assembly is provided having a wheel rotation axis; a first face; a second face axially at the opposite of the first face; a rim around the wheel rotation axis; a first tire and a second tire which are mounted around the rim, which are respectively at the first face and at the second face, and which comprise a tire outer diameter; an outer circular groove with a circular bottom surface forming the rim and axially between the first tire and the second tire, said circular bottom surface comprising a bottom diameter which is smaller than the tire outer diameter; suction ports through the circular bottom surface; a particle collector; a particle suction system configured for generating a suction airflow through the wheel assembly upon rotation of said particle suction system about the wheel rotation axis; an air passage connecting the suction ports to the particle suction system to suck particles with the suction ports.

According to a third aspect of the invention a wheel assembly is provided comprising a wheel rotation axis; a rim with an outer surface around the wheel rotation axis; said outer surface comprising suction ports; two tires mounted on the outer surface of the rim; a center hub; a particle collector adapted to trap particles entering said particle collector, said particle collector being arranged in the center hub; a particle suction system configured for generating a suction airflow adapted to suck particles at an interface between the two tires and a ground surface; and an air passage connecting the suction ports to the particle suction system through the particle collector in order to suck particles through the suction ports by means of the suction air flow generated by the particle suction system.

According to a fourth aspect, the invention provides a vehicle wheel assembly comprising a wheel rotation axis; a tire tread around the rotation axis; said tire tread comprising tread suction ports; a particle collector; an air passage connecting the tread suction ports to the particle collector, and a bladed suction structure configured for driving a suction airflow upon rotation of the bladed suction structure about the wheel rotation axis to accelerate particles in the suction ports.

According to a fifth aspect, the invention provides a wheel assembly comprising a wheel rotation axis; a rim with an outer surface around the wheel rotation axis; said outer surface comprising suction ports; said rim further comprising a bladed suction structure which is arranged in the outer surface and which is configured for generating a suction air flow within the rim upon rotation of said bladed suction structure about the wheel rotation axis; at least one tire mounted on the outer surface of the rim and protruding radially from the suction ports; a particle collector adapted to trap particles entering said particle collector; an air passage connecting the suction ports to the bladed suction structure; the particle collector collecting particles through the suction ports by means of the suction air flow generated by the bladed suction structure.

According to a sixth aspect, the invention provides a particle suction process comprising providing a wheel assembly in accordance with the invention; rotating the wheel assembly at a first rotation speed; generating an air flow across the vehicle wheel; sucking air between the ground and the wheel assembly; and accelerating particles at the contact interface or rearward side of the wheel assembly, and optionally, trapping the absorbed particle in a particle collector; the wheel assembly optionally being in accordance with the invention.

According to a seventh aspect, the invention provides a use of bladed suction structure of a rim of a wheel assembly for generating a suction air flow in said wheel assembly in order to suck up particles through suction ports of said rim; said wheel assembly comprising: a wheel rotation axis; at least one tire mounted on the outer surface of the rim; a particle collector adapted to trap particles entering said particle collector; an air passage connecting the suction ports to the bladed suction structure through the particle collector;

the wheel assembly optionally being in accordance with the invention; the wheel assembly optionally being in accordance with the invention.

Definitions

"Axial" refers to a direction along the wheel rotation axis.

"Carcass" means the tire structure apart from the belt structure, tread, undertread, and sidewall rubber over the plies, but including the beads.

"Equatorial plane (EP)" means the plane perpendicular to the tire's axis of rotation and passing through the center of its tread, or the plane perpendicular to the wheel rotation axis and passing through the center of its rim.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". In the appended drawings, slots are illustrated by single lines because they are so narrow. Grooves generally remain open in a tire footprint.

"Lugs" refer to discontinuous radial rows of tread rubber in direct contact with the road surface.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" refers to the radial direction. The radial direction is perpendicular to the wheel rotation axis.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Tread" means a molded rubber component which, when bonded to a tire casing, includes that portion of the tire that comes into contact with the road when the tire is normally inflated and under normal load.

BRIEF DESCRIPTION OF THE DRAWINGS

The invention will be described by way of example and with reference to the accompanying drawings in which.

DETAILED DESCRIPTION OF THE INVENTION

Figure 1:
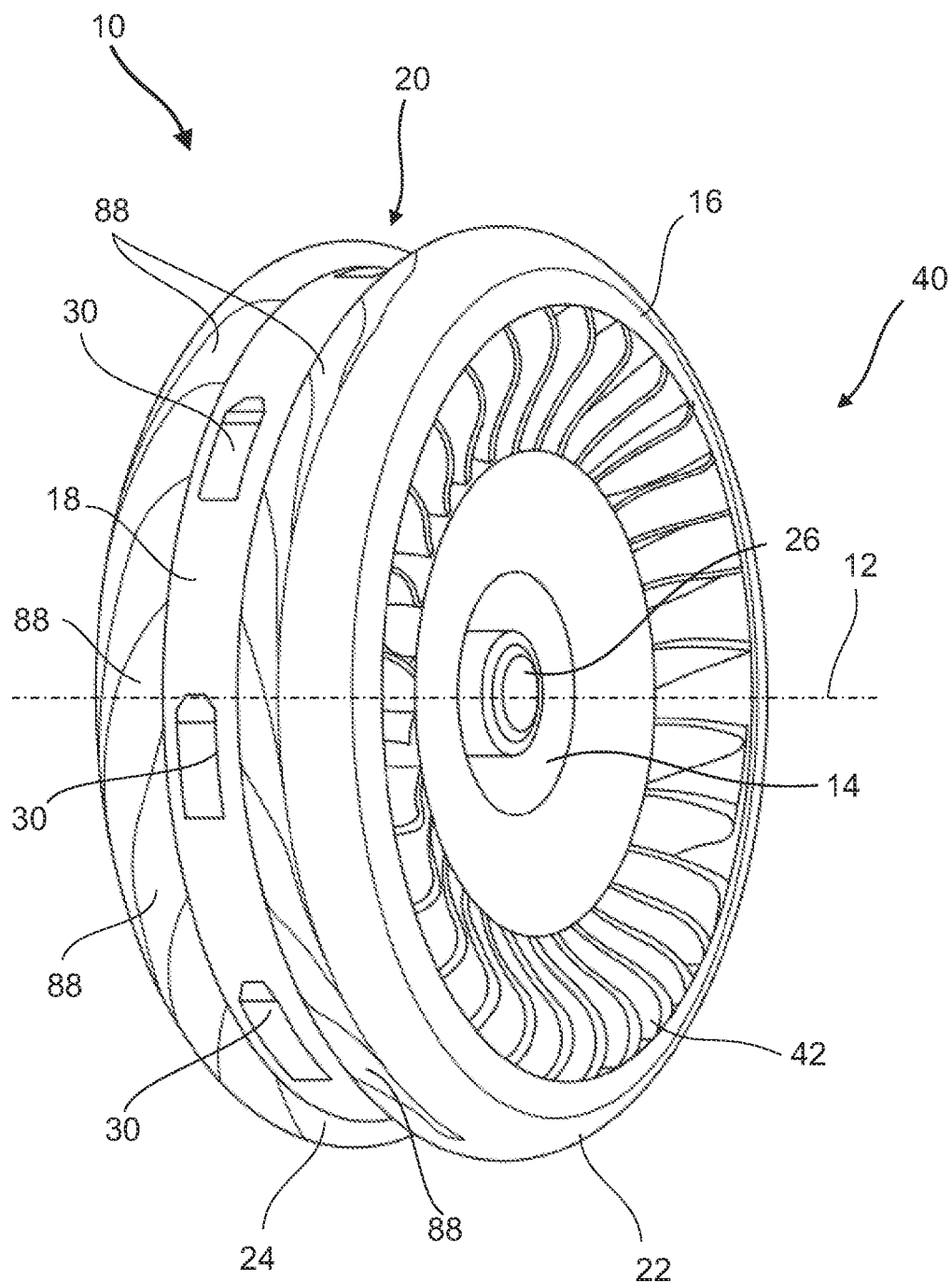
FIG. 1 is a perspective view of a wheel assembly in accordance with a first embodiment invention.

FIG. 1 represents a wheel assembly 10 in accordance with the invention. The wheel assembly 10 is adapted for an automotive vehicle, such as a personal car, a public transportation vehicle, or a heavy-duty vehicle.

The wheel assembly 10 comprises a wheel rotation axis 12. The wheel assembly 10 further comprises a center hub 14 and a rim 16. The rim 16 is around the wheel rotation axis 12 and comprises an outer surface 18. The rim 16 may comprise an outer ring 20 forming the outer surface 18. The outer surface 18 exhibits an annular shape. The outer ring 20 form a tube.

The wheel assembly 10 may comprise a single tire or tires. In the embodiment illustrated in FIG. 1, the wheel assembly comprises two tires, namely a first tire 22 and a second tire 24. The first tire 22 and the second tire 24 are separate and distinct. They may exhibit a tire outer diameter. By convention, the first tire 22 may be in the foreground of FIG. 1. Each defined in connection with the first tire 22 also applies to the second tire 24, except if the contrary is explicitly mentioned. The first tire 22 may be an outboard tire, and the second tire may be an inboard tire.

The one or more tires (22, 24) comprise a tread and can be pneumatic or non-pneumatic. In the embodiment wherein the first tire 22 and the second tire 24 are pneumatic, each one further comprises a carcass. In a non-limiting list, the tread exhibits: grooves, blocks, ribs and lugs.

The wheel assembly 10 further comprises a particle collector 26 adapted to trap particles entering said particle collector 26. The particle collector 26 is arranged at a central position. The particles may be wear particles, or worn residues, of the first tire 22 and the second tire 24, resulting from their contact with the ground. The particles may also be dust particles.

The outer surface 18 comprises an annular array of suction ports 30. The suction ports 30 are angularly distributed about the wheel rotation axis 12. The annular array may comprise between four to twenty suction ports 30. The annular array may comprise between eight to twelve suction ports 30. The suction ports 30 may be aligned. They may be at a same position along the wheel rotation axis 12.

The wheel assembly 10 further comprises a suction system 40 with a bladed suction structure 42 configured for generating a suction airflow within the rim upon rotation of said bladed suction structure about the wheel rotation axis. The bladed suction structure 42 comprises at least one circular array of blades. The blades are optionally planar facets which are parallel to the wheel rotation axis 12 and which extend radially from the rim 16. The bladed suction structure and the rim are optionally one piece. This monobloc configuration increases strength and optimizes the assembly steps.

In addition, the wheel assembly 10 encloses an air passage connecting the suction ports 30 to the bladed suction structure 42 through the particle collector 26 to suck particles through the suction ports 30 using the suction airflow resulting from the rotation of the suction system 40. As an option, the centrifugal force contributes to generating the suction airflow sucking the particles on the ground or tearing off the first tire 22 and the second tire 24.

At least one, preferably each of the two tires (22; 24) comprises channels 88. The channels 88 are extending toward the suction ports 30. The suction ports 30 are axially at distance from the first tire 22 and the second tire 24. The channels 88 are angularly distributed around the wheel rotation axis 12. The channels 88 are formed on the sides of the tires (22; 24) which are adjacent to the suction ports 30. The channels 88 define dimples guiding the airflow toward the suction ports 30 upon rotation of the wheel assembly 10. The channels 88 may have helicoidal shapes.

Figure 2:
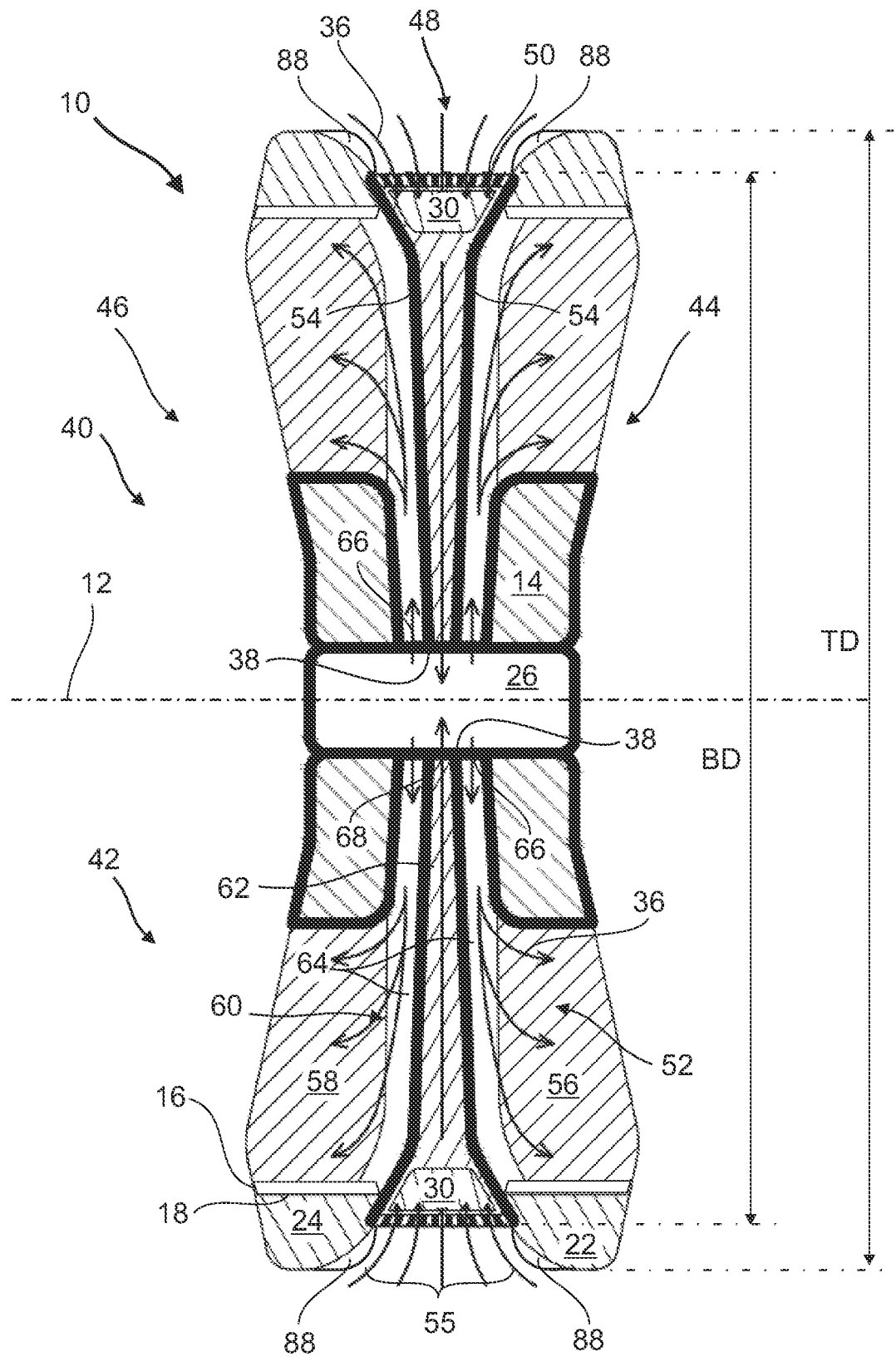
FIG. 2 is a through cut of a wheel assembly in accordance with the invention.

FIG. 2 is a through cut of a wheel assembly 10 per the invention. The through cut is along the wheel rotation axis 12.

The wheel assembly 10 exhibits a wheel rotation axis 12, a first face 44 and a second face 46 axially at the opposite of the first face 44 with respect to the rotation axis 12. The wheel assembly 10 further comprises a rim 16 around the wheel rotation axis 12. The rim 16 receives, around the outer surface 18, a first tire 22 and a second tire 24 which are respectively at the first face 44 and the second face 46. The first tire 22 and the second tire 24 are of the same diameter. They comprise a tire outer diameter TD. In addition, the wheel assembly 10 exhibits a first side at the first face 44, and a second side at the second face 46.

In addition, the wheel assembly 10 exhibits an outer circular groove 48. The outer circular groove 48 exhibits a toroidal shape. It encircles the rim 16. The outer circular groove 48 is open radially outward. The outer circular groove 48 exhibits a circular bottom surface 50. The outer circular groove 48 is a circular suction groove. The circular bottom surface 50 partially forms the rim 16. It is axially between the first tire 22 and the second tire 24. The circular bottom surface 50 comprises a bottom diameter BD which is smaller than the tire outer diameter TD.

The first tire 22 and the second tire 24 each comprise channels 88 extending toward the other of the two tires. The channels 88 are open toward the suction ports 30, and extend from the tread. At each side (44; 46), the channels 88 are converging toward each other. Pairs of channels 88 are arranged in a "V" configuration, wherein the peak of the "V" is pointing toward the suction ports 30, or toward the circular groove 48 in which they are settled. The "V" configuration cases the particle motion toward the suction ports 30. This promotes the cleaning effect of the invention.

The wheel assembly 10 comprises suction ports 30 through the circular bottom surface 50 and a particle collector 26 which is housed in the center hub 14. The suction ports 30 are open toward the particle collector 26. The particle collector 26 comprises a cylindrical body extending along the wheel rotation axis 12. The particle collector 26 is configured for trapping particles entering therein. The particle collector 26 may comprise a filtering element such as a foam body. As an alternative or in addition, it may comprise a chicane wall separating particles from the suction airflow 36 blown inside the particle collector 26. The particle collector 26 is removably mounted in the center hub 14. Then, upon servicing the particle collector 26 may be cleared out; and cleaned. The trapped particles may be collected and recycled.

The wheel assembly 10 comprises a particle suction system 40 configured for generating a suction airflow 36 through the wheel assembly 10 upon rotation of said particle suction system 40 about the wheel rotation axis 12. In other words, the particle suction system 40 is configured for generating a suction airflow 36 adapted to accelerate particles toward and through the suction ports 30.

An air passage 52 connects the suction ports 30 to the particle suction system 40 via and the particle collector 26. The bladed suction structure 42 is configured for sucking air through the rim 16 and to blow said suction airflow 36 axially outside the rim 16 upon rotation of the bladed suction structure 42, which sucks particles and drives them to the particle collector. The suction airflow 36 enters the rim radially and leaves it axially.

The wheel assembly 10 comprises at least one, preferably two separation walls 54 projecting within the air passage 52. The separation walls 54 are axially facing the bladed suction structure 42. The separation walls 54 are perpendicular to the wheel rotation axis 12. The separation walls 54 are partitioning the air passage 52. The separation walls 54 comprise center holes 38 crossed by the particle collector 26. The center holes 38 maintain the particle collector 26.

The bladed suction structure 42 is axially and radially arranged within the rim 16 which forms a radial separation between the bladed suction structure 42, and the first tire 22 and the second tire 24 respectively. The tires (22; 24) are separated by an axial portion of the rim 16. The wheel assembly 10 comprises an axial separation 55, for instance, said axial portion of the rim 16, separates the first tire 22 from the second tire 24. The suction ports 30 are circularly aligned within said axial separation 55.

The particle suction system 42 comprises a first bladed suction structure 56 arranged at the first face 44, and a second bladed suction structure 58 arranged at the second face 46. The particle collector 26 axially extends along the first bladed suction structure 56 and the second bladed suction structure 58. Then, the inner volume of the particle collector 26 is increased. Its ability to trap particles is improved.

The air passage 52 comprises a first disc-shaped portion 60 radially extending from and along the suction structure 40 toward the wheel rotation axis 12, and a second disc-shaped portion 62 extending from the suction ports 30 toward the wheel rotation axis 12. The first disc-shaped portion 60 may comprise sub-portions 64, also designates as side portions. The second disc-shaped portion 62 is arranged between said sub-portions 64. The first disc-shaped portion 60 is in fluid flow communication with each of the first bladed suction structure 56 and the second bladed suction structure 58; for instance through the sub-portions 64. The sub-portions 64 are separated from the second disc-shaped portion 62 by the separation walls 54. The separation walls 54 are demarcating the second disc-shaped portion 62. They divide the air passage 52.

The suction ports 30 may have meshes at their entrances. These meshes exhibits calibrated perforations having a filter effect. This avoids that large particles enter in the wheel assembly 10. Such large particles could clog the second disc-shaped portion 62 and the particle collector 26.

The particle collector 26 comprises two circular outlets 66, and a circular inlet 68 arranged axially between the two circular outlets 66. The circular outlets 66 and the circular inlet 68 generally form circular apertures. The circular outlets 66 are connected to the first disc-shaped portion 60, and more precisely with the sub-portions 64. The circular inlet 68 is connected to the second disc-shaped portion 62 which spans therefrom. The circular inlet 68 is between the separation walls 54.

As a non-illustrated alternative, the wheel assembly 10 comprises a first face and a second face axially at the opposite of the first face; the at least one tire comprising a single tire at the first face, and the suction ports 30 being at the second face.

Figure 3:
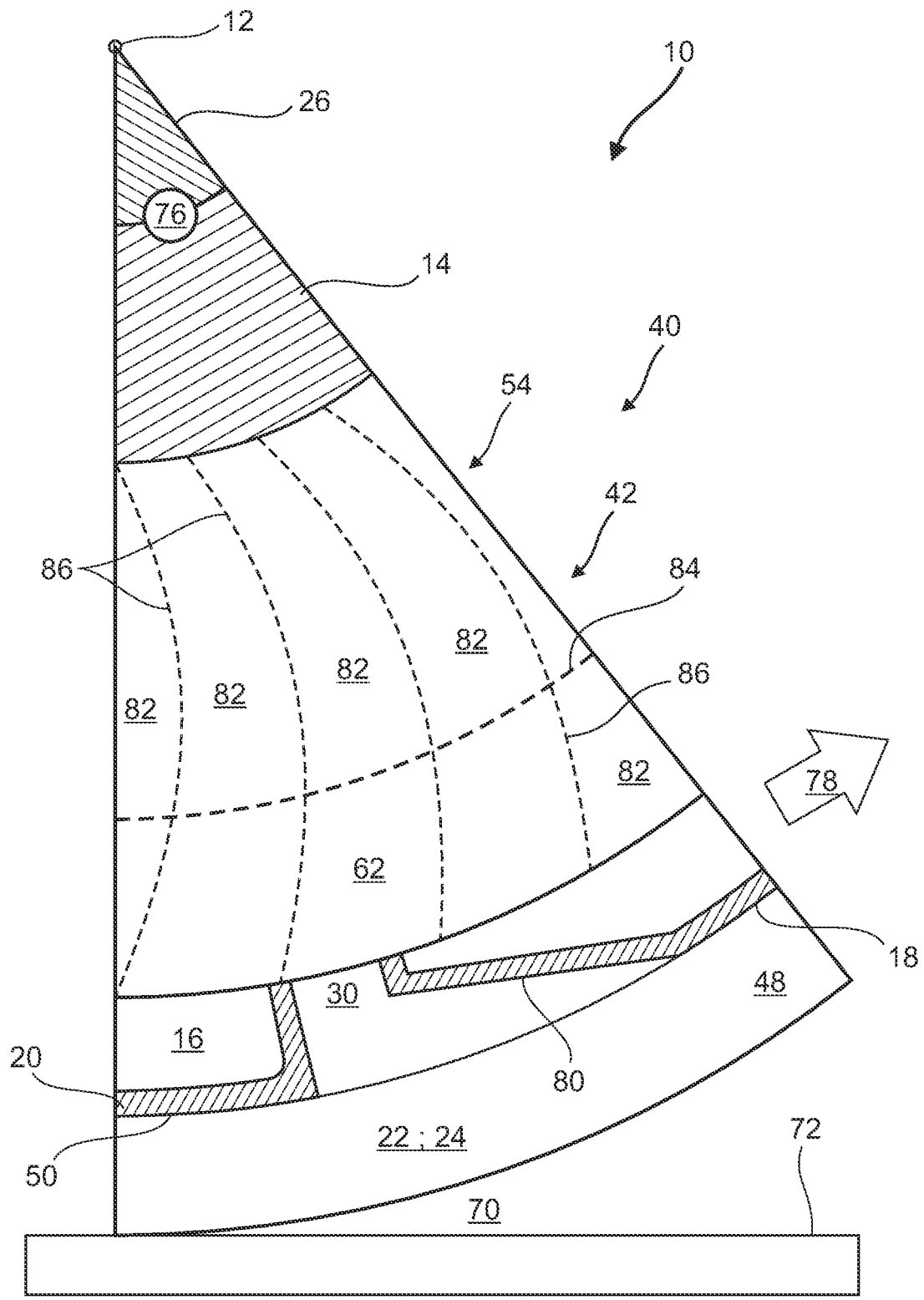
FIG. 3 is a detailed view of the contact area between the ground and a wheel assembly in accordance with the invention.

FIG. 3 represents an angular segment of a through cut of a wheel assembly 10 for a vehicle (not illustrated). The through cut may be at the equatorial plane of the wheel assembly 10. It may be through the second disc-shaped portion 62. The wheel assembly 10 is partially represented, however, the description provided in connection with the current angular segment applies to the whole wheel assembly. The wheel assembly 10 may be similar or identical to the wheel assembly 10 as presented in any of FIG. 1 or 2.

The wheel assembly 10 exhibits a wheel rotation axis 12, a rim 16 with an outer surface 18 around the wheel rotation axis 12. The outer surface 18 is provided with a plurality of suction ports 30; a center hub 14 in the rim 16. The wheel assembly 10 is provided with at least one tire (22; 24) (only one represented). Each tire (22; 24) is maintained by the outer surface 18 of the rim 16. The tires each present an annular tread portion. Each of the suction ports 30 may be a tread suction port. The suction ports 30 may be arranged at the equatorial plane of the wheel assembly 10. The tires (22; 24) form circular beads protruding from the outer surface 18, and thus away from the suction ports 30. Accordingly, the suction ports 30 are kept at distance from the ground surface 72. The suction ports 30 are in elevation with respect to the ground surface 72. This aspect protects the inner surfaces of the suction ports 30.

The wheel assembly 10 encloses a particle collector 26 adapted to trap particles entering said particle collector 26. The particle collector 26 is nested in the center hub 14 and fixed therein in a removable fashion.

A particle suction system 40 is configured for generating a suction airflow adapted to suck particles at an interface 70 between the at least one tire and a ground surface 72. The air passage 52 connects the suction ports 30 to the particle suction system 40 through the particle collector 26 in order to suck particles through the suction ports 26 by means of the suction air flow generated by the particle suction system 40. The suction ports 30 may be particle suction ports, preferably, radially opened particle suction ports.

The rim 16 comprises an outer ring 20 surrounding the particle suction system 40. The bladed suction structure 42 physically connects the center hub 14 to the outer ring 20. The outer ring 20 partially forms the outer surface 18 and surrounds the bladed suction structure 42. The suction ports 30 radially cross said outer ring 20. The outer ring 20 closes the sub-portions of the first disc-shaped portion. The bladed suction structure 42 may be a bladed particle suction structure.

The center hub 14 radially separates the particle suction system 40 from the particle collector 26. The center hub 14 comprises a fixation device 76 adapted to secure the particle collector to the center hub 14. The fixation device 76 may comprise a resilient element engaging a retention ball. It may comprise a fixation pin.

As apparent in the current illustration, the wheel assembly 10 comprises an outer circular groove 48 with a circular bottom surface 50. The circular bottom surface 50 is radially at distance from the ground surface 72. The suction ports 30 are open through the circular bottom surface 50 and are facing said ground surface 72.

The wheel assembly 10 comprises a main rotation direction 78 in which the bladed suction structure generates the suction airflow. The suction airflow may be a particle suction airflow. At least one or each suction port comprises a ramp 80 with a depth reduction along the main rotation direction 78. The depth decrease implies a closer distance with the wheel rotation axis 12. The ramp 80 increases the opening size of the suction ports 30. Then, their active areas are extended for better efficiency.

The bladed suction structure comprises a circular array of radially projecting blades 82. The radially projecting blades 82 are distributed around the wheel rotation axis 12. The radially projecting blades 82 (represented in dotted lines) may form a blower or a fan. Upon rotation, they generate an axial air flow through the particle suction system 40. The radially projecting blades 82 are currently masked by one of the separation walls 54.

The radially projecting blades 82 comprise curved airfoils. Each curved airfoil comprises at least one of: a concave intrados surface, a convex extrados, a curved leading edge, a curved trailing edge 86. The curved trailing edge 86 are at the first face or at the second face. The curved leading edges are axially at distance from the first face and the second face. By convention, an airfoil comprises a radial stacking of chords. A chord is a line joining the curved leading edge to the curved trailing edge 86 of the corresponding airfoil. The curved airfoils comprise chords which are inclined with respect to the wheel rotation axis. This configuration increases the suction air flow generated by the bladed suction structure 42 upon rotation.

The rim 16 comprises spokes physically connecting the center hub 14 to the rim 16. The spokes are formed by the bladed suction structure, notably the radially projecting blades 82.

As an option, the wheel assembly 10 comprises a brake disc 84 surrounded by the suction ports 30. In an embodiment, the suction system is at one side of the wheel assembly 10. The brake disc 84 is axially arranged at the opposite with respect to the particle suction system 40. The brake disc 84 and the particle suction system 40 are both housed in the rim to improve compactness.

Figure 4:
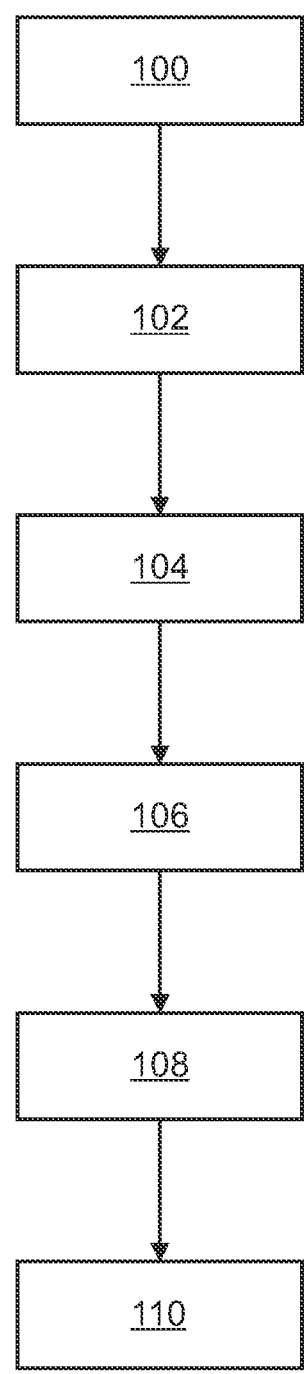
FIG. 4 is a flow chart of a particle suction process in accordance with the invention with a wheel assembly.

FIG. 4 represents a diagram of a particle suction process in accordance with the invention. The wheel assembly may be similar or identical to the one as described in relation with any one of FIGS. 1 to 3.

The particle suction process comprises providing 100 a wheel assembly in accordance with the invention; rotating 102 the wheel assembly at a first rotation speed; generating 104 an airflow across and/or in the wheel assembly; sucking air 106 between the ground surface and the wheel assembly; accelerating 108 particles at the contact interface or rearward side of the wheel assembly toward the suction ports, and optionally, trapping 110 said particles in a particle collector; preferably in the wheel assembly.

At rotating 102, the first rotation speed may be at least 2 rounds per second or at least 10 rounds per second. This rotation speed may be in both rotation directions, or the main rotation direction.

Accelerating 108 particles may comprise sucking particles through suction ports.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A wheel assembly comprising:
   a wheel rotation axis;
   a first face;
   a second face axially at the opposite of the first face;
   a rim around the wheel rotation axis;
   a first tire and a second tire which are mounted around the rim, which are respectively at the first face and at the second face, and which comprise a tire outer diameter;
   an outer circular groove with a circular bottom surface forming the rim and axially between the first tire and the second tire, said circular bottom surface comprising a bottom diameter which is smaller than the tire outer diameter;
   suction ports through the circular bottom surface;
   a particle collector;
   a particle suction system configured for generating a suction airflow through the wheel assembly upon rotation of said particle suction system about the wheel rotation axis;

an air passage connecting the suction ports to the particle suction system in order to suck particles with the suction ports, wherein the air passage comprises a first disc-shaped portion radially extending from the suction structure toward the wheel rotation axis, and a second disc-shaped portion extending from the suction ports toward the wheel rotation axis.

2. The wheel assembly according to claim 1, wherein the particle suction system comprises a first bladed suction structure arranged at the first face, and a second bladed suction structure arranged at the second face, the particle collector axially extending along the first bladed suction structure and the second bladed suction structure, and the suction ports being arranged axially between the first bladed suction structure and the second bladed suction structure.

3. The wheel assembly according to claim 1, wherein the suction ports define a circular array surrounding the particle collector, said particle collector comprising a cylindrical body extending along the wheel rotation axis.

4. The wheel assembly according to claim 1, wherein the particle collector comprises a filtering body which is arranged at one of the first face and the second face; the air passage connecting the suction ports to the particle collector through the particle suction system.

5. A wheel assembly comprising:
a wheel rotation axis;
a rim with an outer surface around the wheel rotation axis; said outer surface comprising suction ports;
two tires mounted on the outer surface of the rim;
a center hub;
a particle collector adapted to trap particles entering said particle collector, said particle collector being arranged in the center hub;
a particle suction system configured for generating a suction airflow adapted to suck particles at an interface between the two tires and a ground surface;
an air passage connecting the suction ports to the particle suction system through the particle collector in order to suck particles through the suction ports by means of the suction air flow generated by the particle suction system, wherein the center hub separates the particle suction system from the particle collector; and wherein the center hub comprises a fixation device adapted to secure the particle collector to the center hub, and wherein the particle collector comprises two circular outlets, and one circular inlet arranged axially between the two circular outlets.

6. The wheel assembly according to claim 5, wherein the rim comprises an outer ring and the particle suction system comprises a bladed suction structure physically connecting the center hub to the outer ring.

7. The wheel assembly according to claim 5, wherein the wheel assembly comprises an outer circular groove with a circular bottom surface, the suction ports being through the circular bottom surface.

8. The wheel assembly according to claim 5, wherein the wheel assembly comprises a brake disc surrounded by the suction ports, the brake disc being axially at the opposite side with respect to the particle suction system.

9. The wheel assembly according to claim 5, wherein the wheel assembly comprises a first side and a second side axially at the opposite of the first side; the wheel assembly further comprises a filtering body at the first side, and the second side is an inboard side.

10. A wheel assembly comprising:
a wheel rotation axis;
a rim with an outer surface around the wheel rotation axis; said outer surface comprising suction ports;
two tires mounted on the outer surface of the rim;
a center hub;
a particle collector adapted to trap particles entering said particle collector, said particle collector being arranged in the center hub;
a particle suction system configured for generating a suction airflow adapted to suck particles at an interface between the two tires and a ground surface;
an air passage connecting the suction ports to the particle suction system through the particle collector in order to suck particles through the suction ports by means of the suction air flow generated by the particle suction system, wherein the wheel assembly comprises a first side and a second side axially at the opposite of the first side; the wheel assembly further comprises a filtering body at the first side, and the second side is an inboard side.

11. The wheel assembly according to claim 10, wherein the rim comprises an outer ring and the particle suction system comprises a bladed suction structure physically connecting the center hub to the outer ring.

12. The wheel assembly according to claim 11, wherein the center hub separates the particle suction system from the particle collector; and wherein the center hub comprises a fixation device adapted to secure the particle collector to the center hub, and wherein the particle collector comprises two circular outlets, and one circular inlet arranged axially between the two circular outlets.

13. The wheel assembly according to claim 12, wherein the wheel assembly comprises an outer circular groove with a circular bottom surface, the suction ports being through the circular bottom surface.

14. The wheel assembly according to claim 13, wherein the wheel assembly comprises a brake disc surrounded by the suction ports, the brake disc being axially at the opposite side with respect to the particle suction system.

* * * * *